UNITED STATES PATENT OFFICE.

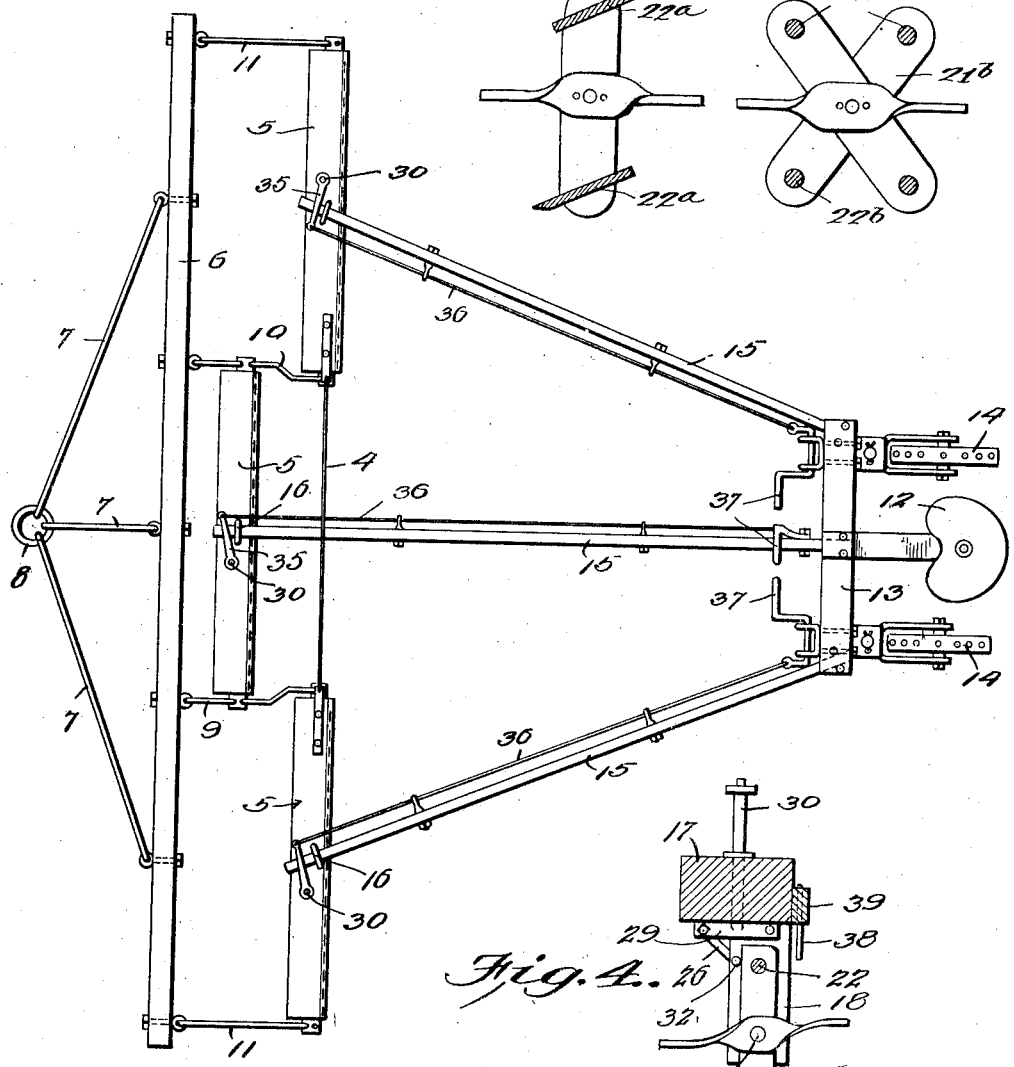

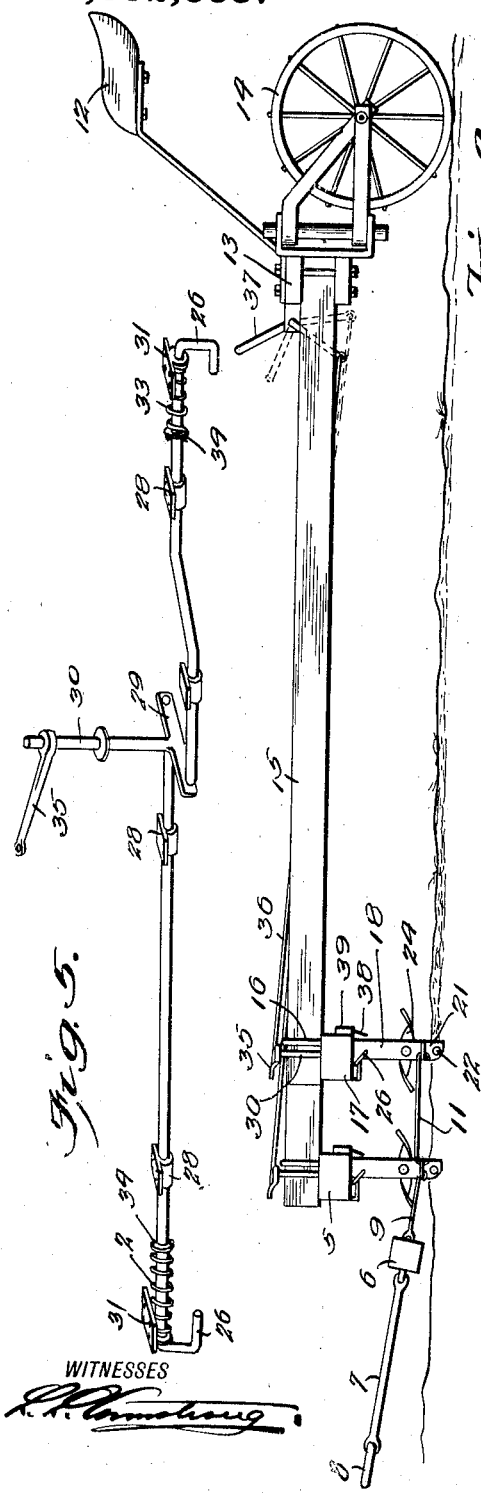

DELL DELBERT SOMMERS, OF CHAMPION, ALBERTA, CANADA.

FARM IMPLEMENT.

1,352,555.     Specification of Letters Patent.     Patented Sept. 14, 1920.

Application filed May 26, 1919. Serial No. 299,910.

*To all whom it may concern:*

Be it known that I, DELL DELBERT SOMMERS, a subject of the King of Great Britain, and a resident of Champion, in the Province of Alberta and Dominion of Canada, have invented certain new and useful Improvements in Farm Implements, of which the following is a specification.

This invention relates to an improvement in farm implements and one of the principal objects of the invention is to provide a bar which travels along beneath the surface of the ground for destroying all weeds and heavy grass, either by pulling the weeds or grass up by the roots and leaving them on the top to dry, or by bending them flat with the ground and covering them with earth to such a depth that they will decay.

Another object of the invention is to pack the soil at the point where the moisture begins in plowed ground, whereby to prevent the soil from drying out, the depth to which the soil is packed being such that the bottom of the furrows, where it is desired to leave a reservoir to hold the moisture, will not be disturbed.

A further object of the invention is to lift and loosen the top soil leaving it in such a state as to form a moisture holding mulsh of such consistency that it will not blow readily.

Still another object of the invention is to provide an improved farm implement of the nature set forth which will be exceedingly simple, durable, efficient in operation and inexpensive to manufacture and maintain.

With these and other objects in view, which will become apparent as the description proceeds, the invention resides in the construction, combination and arrangement of parts hereinafter more fully described and claimed, and illustrated in the accompanying drawings in which like characters of reference indicate like parts throughout the several figures of which:

Figure 1 represents a top plan view of an implement constructed according to my invention.

Fig. 2 represents a side elevational view thereof.

Fig. 3 represents a view in perspective of one of the sections looking toward the rear side thereof.

Fig. 4 represents a view in section taken on the plane indicated by the line 4—4 of Fig. 3 looking in the direction indicated by the arrow.

Fig. 5 represents a view in perspective of the trip mechanism.

Fig. 6 represents a transverse sectional view of another form of the tiller; and Fig. 7 represents a similar view of still another form of tiller.

Referring more particularly to the drawings the implement includes a plurality of sections indicated generally at 5, arranged in staggered relation to each other, as clearly shown in Fig. 1. A draw bar 6, connected by means of links 7 to a ring 8, is connected by means of links 9 to the two ends of the center section 5, and by links 11 to the outer ends of the end sections. Links 10 connect the ends of the middle section to the inner ends of the end sections, a rod 4 connecting the adjacent ends of the rear or end sections. These connections are flexible, whereby the sections may follow and conform to the contour of the ground being treated as the implement travels along. A driver's seat 12 is mounted upon a bar 13 which is supported on caster wheels 14. From the bar 13, tongues 15 extend forward one to each of the sections, these bars at the forward ends being connected by means of U clips or other suitable devices 16, to the central points of the sections on top thereof. Any suitable connecting means allowing flexibility of the tongues relatively to the bar 13 may be used.

The construction of each of the sections 5 being the same, the description of one will suffice for all. A relatively heavy timber 17, is provided with L-shaped brackets at its ends, which brackets provide arms 18 which depend from the beam or timber and which at their lower ends are turned at approximately right angles as at 19, and are provided with openings 20 whereby the links 9 and 11 respectively may be connected to the section.

Between the depending arms 18 of the brackets is mounted a rotatable tiller which includes the end plates 21, connected by the spaced parallel bars 22. These plates at their central portions are pivotally mounted as at 23 on the arms 18 of the brackets. Fixed to the plates 21 at right angles to the plane defined by the bars 22, are the cross arms 24, which at their ends are twisted as at 25, to provide ground engaging means for insuring rotation of the tiller, when the trip mechanism, to be hereinafter described, is released.

It will be understood that ordinarily the tiller does not rotate as the implement moves along, except at such times as it is desired to allow a revolution of the tiller to be made in order to reverse the positions of the bars.

In this connection it may be noted that as the implement moves along the lowermost bar 22, under the weight of the implement, sinks into the plowed ground to a depth of two or three inches and thus travels along beneath the surface of the ground at this depth. Any weeds encountered will either be torn up by the roots, or will be bent flat on the ground. The upper portion or surface of the soil will be lifted and loosened, covering those weeds which are not torn up to a depth of two or three inches so that the weeds will rot. Furthermore, the surface of the soil will be loosened to form a moisture holding mulsh. But the surface will not be broken into such fine lumps that it would readily blow and thus lose its moisture. This movement of the bar along underneath the surface of the ground will pack the sub-soil to a depth of two or three inches, so that the moisture in the sub-soil will be retained. The bottom of the furrows, however, will not be disturbed, and will therefore form reservoirs for retaining the moisture. The implement is adapted to be used in plowed ground whether harrowed or not. Ordinarily the tiller is prevented from rotating by the action of stops 26, formed at the in-bent ends of rods 27, which are arranged in guides 28 beneath the beam or timber 17, and which are adapted to move in opposite directions under the influence of a two-armed lever 29 which may be controlled from the driver's seat. The lever 29 includes a rod 30 which is mounted vertically in the timber 17, the lever 29 being arranged on the under side thereof. The bars 27 are arranged in substantially parallel sections and extend in opposite directions from the lever to the ends of the timbers, where they are projected through guides 31, and are then bent over upon themselves in a substantially U-shape, the inner ends 26 forming stops which project through openings 32 in the arms 18, to normally lie in the path of rotation of the plates 21. Springs 33 interposed between the guides 31 and shoulders 34 of the rods, serve to normally maintain stops 26 in position to hold the tiller against rotation. The upper end of the lever rod 30 is connected by means of the arms 35 with a rod 36, which rod extends through guides along one of the tongues 15, to a point adjacent the bar 13 where it is connected to a foot pedal 37 which is depressible by the foot of the driver.

The implement being in operation, and the lowermost bar having been in use for some time, it will have collected a certain amount of rubbish or trash, and to insure efficient operation of the bar in fulfilling its fuction, it should be cleaned of these obstructions. In order to do so the driver depresses the foot lever 37. This shifts the arm 35 forward, thus turning the lever 29, and moving the rods 27 outward, thus withdrawing the stops 26 from the path of the plates 21. Continued forward movement of the implement, and the drag on the lowermost bar, will then rotate the tiller, bringing the upper bar down forwardly toward the ground, and lifting the lowermost bar up and rearwardly away from the ground. This rotation will be assisted by the ends of the arms 24 engaging with the surface of the earth. The foot pedal having been depressed for an instant will be released. The spring 33 will then return the stops to their normal position so that the half revolution of the tiller having been completed the edges of the plates 21 will strike the stops, thereby substantially stopping the rotary motion of the tiller. This will jolt any obstructions or trash from the bar which has just been in operation. It will furthermore stop the rotation of the tiller in such a position that the bars will have been reversed, that is, the uppermost bar will now be in the earth, and the lowermost bar will have moved up to a point where it clears the surface of the ground.

In order to assist in the removal of the trash or debris from the bars as they are from time to time interchanged in position, a series of teeth 38 are arranged at the rear edge of the timber or beam 17. These teeth may be mounted in a bar 39 attached to the beam 17. The position of the teeth 38 is such, that the bars will pass the line of teeth, just clearing the same, so that these teeth will engage any foreign matter clinging to the bar and thus strip it from the bar and allow it to drop onto the ground.

With reference to Fig. 2, it will be seen that the line of draft occurs approximately along the axis of rotation of the tiller. This will tend to maintain normal position of the working bar at a few inches below the surface of the soil. Ordinarily the weight of the implement is sufficient to sink the working bar to the desired depth. If, however, the weight of the implement is not sufficient, the timber 17 may be weighted in any suitable manner to accomplish this purpose. Any desired number of the sections may be coupled together so that a relatively wide or relatively narrow tilling implement may be thus provided.

Although I have described the preferred embodiment of my invention, I may desire to make such changes in the construction, combination and arrangement of parts as do not depart from the spirit of the invention and the scope of the appended claims.

I may have desired to utilize a tiller constructed as shown in Fig. 6, in which inclined sharpened flat bars 22ª are substituted for the bars 22, or I might use the type shown in Fig. 7, in which two bars 22ᵇ work in the soil at the same time. In this arrangement the bars are supported by crossed end plates 21ᵇ, as shown.

I claim:—

1. A farm implement including a plurality of sections arranged in staggered relation and flexibly connected to each other, a draw bar flexibly connected to each of the sections, a bar having a driver's seat mounted thereon, wheels supporting the bar, tongues flexibly connected to the bar and each connected to one of the sections, tillers carried by the sections, and means for operating the tiller, substantially as described.

2. A farm implement including a beam having brackets depending therefrom, a rotatable tiller mounted between the brackets and including end plates and parallel spaced bars connecting the end plates, cross arms carried by the end plates at right angles to the plane defined by the said bars, means normally holding the tiller against rotation, and means for tripping the first said means.

3. A farm implement including a beam, a tiller rotatably mounted beneath the beam and including a pair of spaced parallel bars adapted to alternately travel underneath the surface of the ground, stop means normally retaining the tiller against rotation, and means for tripping the stop means to allow rotation of the tiller for reversing the position of the bars.

4. A farm implement including a rotatable tiller having spaced parallel bars adapted to alternately travel beneath the surface of the ground, means normally holding the tiller against rotation, and means for tripping the last said means whereby to release the tiller for reversing the position of the bars.

5. A farm implement including a rotatable tiller having spaced parallel bars adapted alternately to travel beneath the surface of the ground, spring controlled stop means normally retaining the tiller against rotation, and means for tripping the spring controlled means whereby to allow the tiller to rotate for reversing the position of the bars.

6. A farm implement including a rotatable tiller having spaced parallel bars, and a series of teeth arranged in such position with respect to the bars that rotation of the tiller will move the bars alternately across the series of teeth in proximity thereto, whereby to remove any foreign matter adhering to the bars.

7. A farm implement including a rotatable tiller having spaced parallel bars adapted to alternately travel beneath the surface of the ground and means for normally constraining said tiller against rotation to maintain one of said bars beneath the surface of the ground and releasable by the driver of the implement to allow rotative movement of the tiller to thereby alternate said bars, substantially as described.

8. A farm implement including a rotatable tiller having a plurality of bars arranged in substantially parallel relation, the lowermost bar adapted to travel beneath the surface of the ground, means for allowing rotation of the tiller at will, and means for stripping the lowermost bar of obstructions during the rotation of the tiller.

9. A farm implement including a tiller mounted for rotation on a horizontal axis and including a plurality of spaced relatively horizontal bars, the lowermost of which is adapted to engage with the earth, means for allowing rotation of the tiller at will, and means for stripping the lowermost bar of obstructions as the tiller rotates.

10. A farm implement comprising a rotatable tiller including end plates, spaced parallel bars connecting the end plates and cross arms carried by the end plates and arranged at angular relation to the plane defined by said bars and means for normally constraining said tiller against rotation and releasable by the driver of the implement to permit said bars and cross arms to effect rotation of said tiller.

11. A farm implement including a beam having brackets depending therefrom, a rotatable tiller carried by the brackets and including end plates and spaced parallel bars carried by the end plates, a rod carried by the beam, a stop formed on the rod and journaled in the brackets, a spring carried on the rod and normally maintaining the stop in position to engage said tiller and maintain the same against rotation, and means for releasing said stop.

DELL DELBERT SOMMERS.